United States Patent
Beck

(10) Patent No.: US 9,716,406 B2
(45) Date of Patent: Jul. 25, 2017

(54) PHOTOVOLTAIC INSTALLATION AND METHOD OF OPERATING THE INSTALLATION WITH DELAYED BATTERY CONNECTION IN CASE OF AN EMERGENCY REQUEST

(71) Applicant: ADENSIS GMBH, Dresden (DE)

(72) Inventor: Bernhard Beck, Ot Dimbach (DE)

(73) Assignee: Adensis GmbH, Dresden (DE)

( * ) Notice: Subject to any disclaimer, the term of this patent is extended or adjusted under 35 U.S.C. 154(b) by 622 days.

(21) Appl. No.: 14/185,265

(22) Filed: Feb. 20, 2014

(65) Prior Publication Data

US 2014/0167505 A1 Jun. 19, 2014

Related U.S. Application Data

(63) Continuation of application No. PCT/EP2012/003378, filed on Aug. 8, 2012.

(30) Foreign Application Priority Data

Aug. 20, 2011 (DE) .......................... 10 2011 111 192

(51) Int. Cl.
*H02J 1/10* (2006.01)
*H02J 9/00* (2006.01)
(Continued)

(52) U.S. Cl.
CPC ...... *H02J 9/00* (2013.01); *H02J 3/18* (2013.01); *H02J 3/32* (2013.01); *H02J 3/385* (2013.01);
(Continued)

(58) Field of Classification Search
CPC .. G05F 3/06; G05F 3/08; H02M 1/20; H02M 7/44; H02M 7/68; H02P 1/04; H02J 7/35;
(Continued)

(56) References Cited

U.S. PATENT DOCUMENTS 8,179,000 B2 * 5/2012 Beck ...................... H02J 7/35
307/151
8,310,094 B2 11/2012 Yamada et al.
(Continued)

FOREIGN PATENT DOCUMENTS

EP 1986306 A1 10/2008
EP 2244352 A2 10/2010
(Continued)

*Primary Examiner* — Arnold Kinkead
(74) *Attorney, Agent, or Firm* — Muncy, Geissler, Olds & Lowe, P.C.

(57) ABSTRACT

A photovoltaic system has a plurality of subsystems, each with a photovoltaic generator and an associated inverter. The inverter has a control element for setting the maximum power point of its subsystem. A battery is connectible in parallel with the photovoltaic generator. The inverters are connectible to a power grid, which is operated by a utility operator. When a control device receives an emergency signal from the utility operator indicating impending instability of the grid, the following is initiated: If the battery voltage is above the current voltage as set by the MPP control element, the battery is immediately connected to the input of the inverter while the generator remains connected to the inverter. If the battery voltage is below the current voltage the battery connection is delayed until the MPP control element has adjusted the voltage. Then the voltage is further lowered to generate a discharge current from the battery.

11 Claims, 1 Drawing Sheet

(51) Int. Cl.
    *H02J 7/35*     (2006.01)
    *H02J 9/06*     (2006.01)
    *H02S 40/32*     (2014.01)
    *H02S 40/34*     (2014.01)
    *H02J 3/18*     (2006.01)
    *H02S 40/38*     (2014.01)
    *H02J 3/42*     (2006.01)
    *H02M 7/68*     (2006.01)
    *H02M 1/20*     (2006.01)
    *H02S 30/10*     (2014.01)
    *H02J 3/32*     (2006.01)
    *H02J 3/38*     (2006.01)
    *H02J 3/00*     (2006.01)

(52) U.S. Cl.
    CPC   *H02J 3/42* (2013.01); *H02J 7/35* (2013.01); *H02J 9/06* (2013.01); *H02M 1/20* (2013.01); *H02M 7/68* (2013.01); *H02S 30/10* (2014.12); *H02S 40/32* (2014.12); *H02S 40/34* (2014.12); *H02S 40/38* (2014.12); *H02J 2003/001* (2013.01); *Y02E 10/563* (2013.01); *Y02E 10/566* (2013.01); *Y02E 10/58* (2013.01); *Y02E 70/30* (2013.01); *Y10T 307/344* (2015.04)

(58) Field of Classification Search
    CPC .... H02J 3/383; H02J 3/385; H02J 9/00; H02J 9/06; H02J 3/42; H02J 3/18; Y02E 10/563; H02S 50/00; H02S 40/34; H02S 40/32; H02S 30/10; H02S 40/38; H02S 1/20
    USPC ........... 307/151, 29; 318/106, 480; 363/102, 363/95; 323/311; 700/287
    See application file for complete search history.

(56) References Cited

U.S. PATENT DOCUMENTS

| | | | |
|---|---|---|---|
| 8,410,634 | B2 | 4/2013 | Park |
| 2007/0290636 | A1* | 12/2007 | Beck ...................... H02J 3/385 318/106 |
| 2010/0090634 | A1* | 4/2010 | Beck ...................... H02J 3/383 318/480 |

FOREIGN PATENT DOCUMENTS

| | | |
|---|---|---|
| EP | 2330726 A2 | 6/2011 |
| JP | 06266458 | 9/1994 |
| JP | 2007295718 A | 11/2007 |

\* cited by examiner

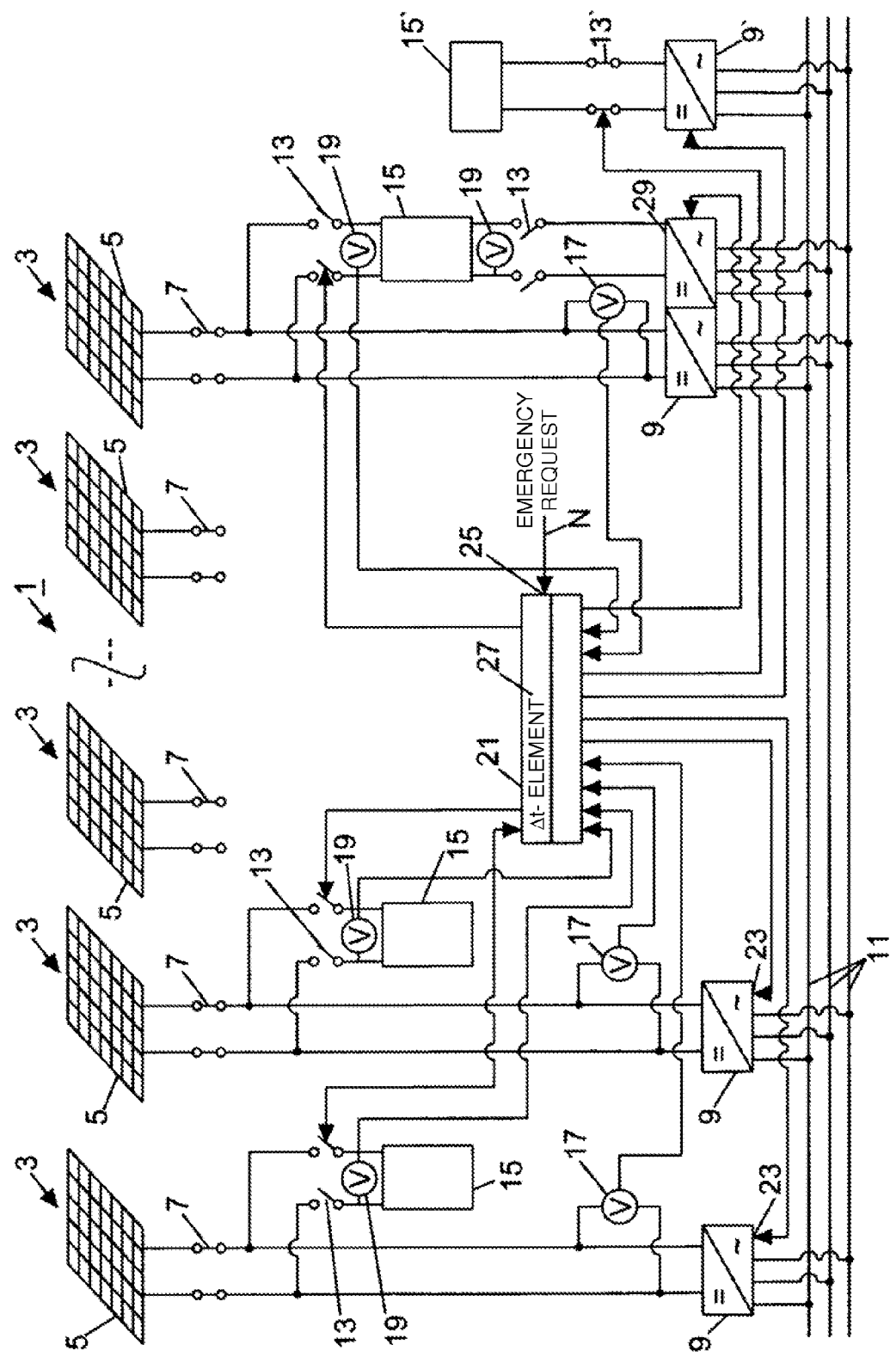

PHOTOVOLTAIC INSTALLATION AND METHOD OF OPERATING THE INSTALLATION WITH DELAYED BATTERY CONNECTION IN CASE OF AN EMERGENCY REQUEST

CROSS-REFERENCE TO RELATED APPLICATION

This application is a continuation, under 35 U.S.C. §120, of copending international application No. PCT/EP2012/003378, filed Aug. 8, 2012, which designated the United States; this application also claims the priority, under 35 U.S.C. §119, of German patent application No. DE 10 2011 111 192.5, filed Aug. 20, 2011; the prior applications are herewith incorporated by reference in their entirety.

BACKGROUND OF THE INVENTION

Field of the Invention

The invention relates to a photovoltaic installation which is composed of a plurality of partial photovoltaic installations each of which comprises a photovoltaic generator which can be connected to the input of an inverter allocated thereto, wherein a control element for setting the maximum power point (MPP) of the partial photovoltaic installation connected thereto is inherent to the inverter, and wherein each of the plurality of partial photovoltaic installations comprises a battery that can be connected in parallel to the photovoltaic generator, wherein the outputs of all inverters can be connected to a common electrical grid which is operated by a grid operator. Furthermore, the invention relates to a related method for operating the photovoltaic installation.

In the recent past, the stability of electrical grids has increasingly become an essential topic. In particular, the employment of an increasing number of plants supplying renewable energy contributes to the fact that an electrical grid is less predictable and more susceptible to supply bottlenecks as long as the issue of a noteworthy storage of electrical energy has not been solved yet. In this context, it must be stated that any in feed of electrical energy tends to rise the voltage and any consumption tends to reduce the voltage. Since the voltage-rising in feed can change very quickly (e.g., a cloud in the otherwise blue sky causes a drop in the output of the photovoltaic installation by 90%), the voltage level at the allocated grid linking point can also change. In dozens of wind turbines and solar plants, the voltage in the grid may vary accordingly, subject to whether the wind is blowing and/or the sun is shining. The supply situation in the grid is accordingly unreliable, and there may be bottlenecks; it is not even possible to exclude the risk of a system collapse.

My earlier, commonly assigned, U.S. Pat. No. 8,179,000 B2 and its European counterpart EP 2 244 352 describe an operating method according to which, at first, two partial photovoltaic installations are jointly connected to only one of two electromechanical inverters each allocated to the partial plants. In a further step, a battery is connected to the remaining free inverter in order to increase the output of the overall system.

Furthermore, it is known to provide a battery in parallel to a photovoltaic generator with associated inverter, wherein said battery can be connected to the electrical grid via its own inverter in order to feed additional energy into the electrical grid. In one of the Applicant's non-pre-published applications, it is provided to save the second inverter for the battery and, in lieu thereof, to also use the inverter inherent in the photovoltaic installation in order to be able to provide a required minimum power at the output of the inverter. In this case, the total power is of course limited to the nominal power of the inverter for the photovoltaic generator.

SUMMARY OF THE INVENTION

The present invention is based on the consideration that, in the event of an imminent grid instability, the inverters of all available photovoltaic installations should be utilized as fully as possible in order to inject energy into the electrical grid. When the supply of energy is switched from an inverter of a photovoltaic installation which currently does not feed in its maximum power to a battery which can provide the maximum power for in-feed, there will be a power lag of approx. 20 ms to 100 ms during the switching process which might trigger a breakdown of the electrical grid. The amount of the power lag would be 100% because the power flow is briefly interrupted while the change from the photovoltaic generator to the battery is in progress.

It is accordingly an object of the invention to provide a photovoltaic plant and an operating method which overcome the above-mentioned disadvantages of the heretofore-known devices and methods of this general type and which decrease the risk of instability or a breakdown of the electrical grid by making a soft switching transition with only a small temporary power loss.

With the foregoing and other objects in view there is provided, in accordance with the invention, a photovoltaic installation, comprising:

a plurality of partial photovoltaic installations each including a photovoltaic generator disposed for connection to an input of an associated inverter, wherein an MPP control element for setting a maximum power point of the respective said partial photovoltaic installation connected thereto is inherent to said inverter, and each of said partial photovoltaic installations including a battery connectible in parallel to said photovoltaic generator all of said inverters of said partial photovoltaic installations having outputs connectible to a common electrical grid operated by a grid operator;

a control device configured to initiate the following measures upon receiving from the grid operator an emergency signal on occasion of an imminent instability of the electrical grid:

i) if a battery voltage lies above a voltage currently set by said MPP control element, causing an immediate connection of the battery to the input of said inverter while at the same time maintaining a connection of said photovoltaic generator to said inverter; and ii) if the battery voltage lies below the voltage currently set by said MPP control element, deferring a connection of the battery to the input of said inverter until said MPP control element has adjusted the voltage applied to the input to the battery voltage and, following a connection of the battery, further reducing the voltage in order to generate a discharge current from the battery.

In other words, the objects of the invention are achieved by way of a control device which initiates the following actions if there is an emergency signal which the grid operator delivers to the control device in the event of an imminent instability of the electrical grid, particularly caused by a supply bottleneck or an imminent low voltage at a grid point:

i) If the battery voltage ($V_{batt}$) is above the voltage ($V_{inv}$) that is currently set by the MPP control element, an immediate connection of the battery to the input of the inverter is caused while the connection of the photovoltaic generator to the inverter is maintained at the same time.

ii) If the battery voltage is below the voltage currently set by the MPP control element, the connection of the battery to the input of the inverter is deferred until the MPP control element has adjusted the voltage applied to the input to the battery voltage; after the battery has been connected, the voltage is further reduced in order to generate a discharge current from the battery.

Therein, an emergency signal is to be understood as every signal that is delivered by the grid operator or an agency authorized or commissioned by the grid operator if the grid situation comes close to a critical condition. In case of a 230-volt electrical grid with a maximum allowed downward and upward deviation of, e.g., 10% (corresponding to 207 volts to 253 volts), this can, for example, be a lower voltage of 210 volts at which the emergency signal is given. An imminent instability of the grid can also be caused by a critical deviation from the grid frequency, an inadmissibly high current in a transformer to a different grid level, and the like. If the emergency signal is generated in a voltage-sensitive manner, this signal is advantageously delivered to the control device if the grid voltage at the grid point in question is only 1 volt to 5 volts, particularly 2 volts to 4 volts, above the allowed lower limit.

As regards the method, the problem is solved according to the invention by means of a control device which initiates the following steps if there is an emergency signal which the grid operator delivers to the control device in the event of an imminent breakdown of the electrical grid, particularly caused by a supply bottleneck or an imminent low voltage at a grid point:

i) The batteries of at least a part, particularly of all partial photovoltaic installations, having a battery voltage above the voltage currently set by the MPP control element are immediately connected to the input of the allocated inverter while the connection of the associated photovoltaic generator is maintained at the same time.

ii) Where the partial photovoltaic installations the battery voltage of which is below the voltage currently set by the MPP control element are concerned, the connection of the battery to the input of the inverter is deferred until the MPP control element has adjusted the voltage applied to the input to the battery voltage; after the battery has been connected, the voltage is further reduced in order to generate a discharge current from the battery.

The step at i) increases the current to the inverter without any delay and simultaneously makes a first contribution to stabilizing the grid. Initially, the step at ii) briefly contributes to further destabilizing the grid by the fact that, for the duration of the maladjustment to the maximum power point, there is only a power available from the PV generator for conversion into alternating current that is reduced by approx. 10%. Subsequent to the adjustment, the power is immediately raised above the battery discharge and the contribution to stabilization is made. The power lag taking place while the battery is connected is therefore considerably reduced as compared with a switching process with interruption. There is a particular advantage if, during the current working situation of the PV plant, there is at least one partial photovoltaic installation which has a battery voltage above the MPP voltage. Then, the connection of the partial photovoltaic installation having the high battery voltage that is immediately initiated after the emergency requirement signal has been received, the amount of additional power that is provided for the grid is such that the power lag occurring when partial photovoltaic installations having a battery voltage below the MPP voltage are connected can be compensated as a whole at least partially by the photovoltaic installation. Therein, the battery is connected in parallel to the connected photovoltaic generator of the partial plant, with the result that both the battery and the partial photovoltaic installation are connected to the inverter and release energy into the electrical grid. If there is a partial photovoltaic installation having a battery voltage above the currently set MPP voltage, its battery is therefore connected immediately before the adjustment to the battery voltage is initiated in the other partial photovoltaic installations. Due to the connection of the battery, the working point of the partial photovoltaic generator will move a little away from the MPP; this, however, does not question the positive total balance when an immediate stabilization contribution is reached.

It is appropriate that, if a plurality of connections of batteries have to be deferred, the required adjustments to the MPP of the inverters involved are made in a time-staggered manner. If, e.g., there are six partial photovoltaic installations in which the current MPP working voltage is above the battery voltage, the connection process for all of the six batteries should not be initiated immediately or simultaneously. It must be taken into account that an increased power lag would be caused by the fact that the current generated by the PV plants would, preferably, serve to charge the battery instead of being provided to the inverter for conversion purposes. The resultant necessity to adjust the MPP working voltage to the battery voltage takes a certain time period in which the small power lag addressed above occurs. In order to prevent all of the six partial photovoltaic installations from making the adjustment at the same time which would result in an increased power drop of six times 10%, i.e. 60% of a single partial photovoltaic installation the time-staggered method is provided. This equalizes the instances at which the adjustment is initiated, with the result that there are six small successive power retardations instead of one intense power retardation. Ideally, the time staggering is configured such that the power drop of a partial photovoltaic installation, which results from the adjustment to the battery voltage because the maximum power point is left, does not overlap with the power drop of any of the other partial photovoltaic installations.

In order to obtain a battery power connecting process that is as soft as possible (free from major retardations in the power supply), it is furthermore appropriate to start with the adjustment of the partial photovoltaic installation in which the difference between the voltage associated with the current maximum power point and the battery voltage is the smallest. There, the adjustment can be reached the most quickly and the corresponding power retardation is particularly short. Since every completed battery connecting process is already accompanied by an increase in power of the overall plant, the power retardation of the complete photovoltaic installation is kept short in this manner. This will be illustrated by an example.

It is assumed that there is a plurality of partial photovoltaic installations the inverters of which each comprise a nominal power of 70 MW. Furthermore, it is assumed that the voltage of the batteries of two of the existing partial photovoltaic installations which are qualified for additionally feeding in energy because of their charge is 600 volts. If one of the partial photovoltaic installations generates a power of 40 W at a voltage of 640 volts and a second partial photovoltaic installation generates a power of 50 MW at a voltage of 680 volts, the transition that is achieved is softer if the first partial photovoltaic installation the maximum power point of which is 640 volts is the first one used for connecting the battery. In this case, the inverter of that partial photovoltaic installation is activated such that its power point is at a voltage of 600 volts which corresponds to the current battery voltage. The resultant lower power yield of its allocated photovoltaic generator is accepted because the MPP is left. After the adjustment, the battery is connected and the voltage along the currently present MPP characteristic curve (which is subject to solar radiation, temperature, etc.) is further reduced in order to provoke a discharge current from the battery. As a result, the photovoltaic generator operates even a little farther away from its actually possible MPP, i.e., the maladjustment is increased further a little. Conversely, however, the battery discharge current adds to the PV generator current and the power that can be processed by the inverter and fed into the electrical grid is in excess of the 40 MW that was available beforehand when no battery was connected, more ideally a power corresponding to the nominal power of 70 MW. This additional power of 30 MW immediately contributes to stabilizing the electrical grid and allows accepting further major retardations in the power loss. Such a major retardation would, for example, occur when the battery of the further partial photovoltaic installation is connected because the current working voltage of that battery that is associated with the MPP is 680 volts and therefore 40 volts higher than that of the first partial photovoltaic installation, i.e. farther away from the battery voltage of 600 volts than the 640 volts of the first partial photovoltaic installation.

There may be a situation in which one or a plurality of the partial photovoltaic installations do not have the photovoltaic generator connected, for example, because maintenance or repair is pending. The battery can be directly connected to the input of the inverter if the emergency signal is received, even in these idle partial plants. The same effect can be achieved if a separate stand-by inverter with an associated battery is provided in addition to the partial photovoltaic installations. In either case, such an amount of additional energy can then be provided ad hoc to the electrical grid that the adjustment to the battery voltage in all partial photovoltaic installations requiring adjustment can be simultaneously initiated. The power retardations to be simultaneously expected are compensated by the additional supply of electrical energy that is already previously started by the stand-by battery or the battery of the inactive partial photovoltaic installation. As a result, the balance with regard to the additional electrical energy supply supporting the electrical grid is still positive after the emergency signal has been received.

Other features which are considered as characteristic for the invention are set forth in the appended claims.

Although the invention is illustrated and described herein as embodied in a delayed battery connection in case of an emergency request, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE shows a photovoltaic installation which comprises a plurality of partial photovoltaic installations, having an emergency signal input at the control device.

DETAILED DESCRIPTION OF THE INVENTION

Referring now to the sole FIGURE of the drawing in detail, there is shown a photovoltaic plant or installation 1 which comprises a total of ten partial photovoltaic installations 3. The FIGURE shows the first two photovoltaic installations 3 as well as the tenth one with their essential components that are relevant to the invention. All other photovoltaic installations 3 are designed identically. Each photovoltaic installation 3 has a photovoltaic generator 5 assigned to it, which is connected to an inverter 9 via a first switching device 7. The output of the inverter 9 is connected to an electrical grid 11 which is operated by a grid operator or a sub-grid operator, such as a public utility.

In each of the partial photovoltaic installations 3, an allocated battery 15 can be connected to the input of the inverter 9 via a second switching device 13. The voltage $U_{inv}$ across the input of the inverter 9 is measured by means of a first voltage measuring device 17. The voltage $U_{batt}$ present at the terminals of the battery 9 is likewise measured by means of a second voltage measuring device 19. The components mentioned are provided in each of the partial photovoltaic installations 3.

In all partial photovoltaic installations 3, the first and the second switching devices 7 and 13, respectively, the first and the second voltage measuring devices 17 and 19, respectively, as well as the inverter 9 are connected to a control device 21. The connection may be wireless or wired. Therein, the control device 21 can execute the following functions: It can process the measured voltage values $U_{inv}$ and $U_{batt}$ in an inherent processing unit (not shown), it can change the switch position of the first and the second switching devices 7, 13, and it can define the working point of the inverters 9 separately for each single inverter 9. To achieve this, the inverters 9 each comprise a control input 23 via which the operating mode of the semiconductor devices, more particularly IGBTs, that are present in the inverter can be adjusted.

According to the invention, the control device comprises an input 25 to which the grid operator can apply an emergency signal N if necessary. The conditions under which such an emergency signal is generated and given to the input 25 of the control 21 have already been discussed in the introductory section.

If the emergency signal is applied, the control device 21 determines which of the batteries 15 of the individual partial photovoltaic installations have a voltage above the respective current MPP voltage. At least a part of these batteries 15 is immediately connected to the allocated inverters 9 in addition to the respective photovoltaic generators 5, without the working point of the MPP control element being moved beforehand for voltage adjustment purposes.

If the emergency signal N is applied, the control device 21 furthermore determines the remaining batteries 15 the voltage of which is below the current MPP working point of the partial photovoltaic installation 3 and the amount of the voltage difference between the battery voltage and the respective MPP voltage. Furthermore, the control device determines the partial photovoltaic installation 3 whose difference between the current battery voltage $U_{batt}$ and the present working voltage $U_{inv}$, of the currently present maximum power point of the inverter 9 is the smallest. Once this partial photovoltaic installation 3 is determined, the working point of the specific inverter 9 is regulated away from the maximum power point MPP via the signal line which ends at the input 23 of said inverter 3, until the voltage $U_{inv}$, is equal to the voltage $U_{batt}$. Subsequently, the control device 21 activates the second switching device 13 such that the previously open switching contacts are moved to the closed switch position. As a result, the photovoltaic generator 5 and the battery 15 in this single previously determined partial photovoltaic installation 3 are disposed in parallel to the input terminals of the inverter 9.

Next, the control device 21 further modifies the working point of the inverter 9 such that the voltage $U_{inv}$ applied to the input is less than at the time when the battery 15 is connected in parallel to the PV generator 5. Due to the voltage difference present between the higher $U_{batt}$ and the lower $U_{inv}$, there will be a discharge current from the battery 15, which the inverter 9 converts into alternating current and feeds it into the electrical grid 11. The sum total of the currents of the PV generator 5 and the battery 15, multiplied by the reduced voltage $U_{inv}$, results in a power P which, as a whole, is in excess of the power previously generated by the partial photovoltaic installation 3 alone. After the battery 15 having the smallest voltage difference from the MPP voltage has been connected, the same steps are taken for the partial photovoltaic installation having the second smallest difference, etc., until the stability of the electrical grid, as seen by the grid operator, is satisfactory and the emergency signal N is revised.

The control device 21 furthermore comprises a time element 27 which serves to achieve a time-staggered adjustment of the individual battery voltages $U_{batt}$ to the allocated inverter voltages $U_{inv}$. As a result, this implies that the second switching devices 13 of the individual partial photovoltaic installations 3 are also successively activated, so that there will be a time-staggered connection of the batteries 15 of the individual partial photovoltaic installations 3. Therein, the order of connection of the individual partial photovoltaic installations 3 can be determined taking the aforementioned smallest voltage differences between the respective battery voltage $U_{batt}$ and the associated inverter voltage $U_{inv}$ into account. Starting with the smallest voltage difference of the battery 15 being the first to be connected, the batteries 15 of the partial photovoltaic installations 3 with the second smallest, the third smallest, the fourth smallest, etc. voltage difference are gradually coupled to the allocated inverters.

Another criterion for selecting which partial photovoltaic installation 3 should be the first one can be the power currently generated by the PV generator 5 or the power fed by the inverter 9 into the electrical grid 11. The lower the current power, the higher the additional power from the battery 15 that can be fed in. Referring to the numerical example discussed at the outset, which comprises two partial photovoltaic installations 3 with the same nominal power of the inverter 9 of 70 MW, the partial photovoltaic installation 3 which currently feeds the lower power is therefore preferred, i.e. the one with 40 MW rather than the one with 50 MW.

The FIGURE furthermore shows an additional battery 15' which can be coupled to a separate inverter 9' via a switching device 13'. No photovoltaic generator 3 is connected to the additional inverter 9'. This arrangement serves as a stand-by measure which allows stabilizing the electrical grid without any power retardation in case the emergency signal N is applied. To achieve this, the stand-by battery 15' is first coupled to the electrical grid if the emergency signal N is applied. The power that is thus additionally fed in covers the fact that there are temporary power drops during the following coupling processes of the batteries 15 of the individual photovoltaic generators 3. If the situation present before the emergency signal is given is taken as a basis, the then occurring retardations cause an in feed of additional power into the electrical grid 11 that is lower for a short time only. That means that the more of fed-in power is only reduced to a minor degree.

The same effect can be reached if at least one of the inverters 9 is provided with an additional stack 29 which can be activated separately. That means that this stack can be moved to its own operating point which is independent of the operating point for the photovoltaic generator 5 that is set by the MPP control. The voltage of this separate operating point then is the battery voltage $U_{batt}$, and additional power is immediately fed into the electrical grid 11 when the second switching device 13 closes. The FIGURE shows such an embodiment of the inverter 9 in the last photovoltaic generator 3, i.e. to the left of the stand-by components 15', 13' and 9'. In either case, it is also possible to connect the batteries 15 of all photovoltaic generators 3 simultaneously.

Once more in summary: The novel photovoltaic installation 1 comprises a plurality of partial photovoltaic installations 3 each of which comprises a photovoltaic generator 5 which can be connected to the input of an inverter 9 allocated to the photovoltaic generator. The inverter contains a control element for setting the maximum power point MPP of the partial photovoltaic installation connected thereto. A battery 15 can be connected in parallel to the photovoltaic generator, wherein the outputs of all inverters can be connected to a common electrical grid 11. The grid is operated by a grid operator. A control device 21 is provided which initiates the following measures if there is an emergency signal N which the grid operator delivers to the control device in the event of an imminent instability of the electrical grid:

i) If the battery voltage $U_{batt}$ is above the voltage $U_{inv}$ that is currently set by the MPP control element, an immediate connection of the battery to the input of the inverter is caused while the connection of the photovoltaic generator to the inverter is maintained at the same time.

ii) If the battery voltage is below the voltage currently set by the MPP control element, the connection of the battery to the input of the inverter is deferred until the MPP control element has adjusted the voltage applied to the input to the battery voltage; after the battery has been connected, the voltage is further reduced in order to generate a discharge current from the battery.

The measures serve to stabilize the electrical grid while preventing brief power drops caused by the circuitry.

The invention claimed is:

1. A photovoltaic installation, comprising:
   a plurality of partial photovoltaic installations each including a photovoltaic generator disposed for connection to an input of an associated inverter, wherein an MPP control element for setting a maximum power point of the respective said partial photovoltaic installation connected thereto is inherent to an inverter, and each of said partial photovoltaic installations including a battery connectible in parallel to said photovoltaic generator, all of said inverters of said partial photovoltaic installations having outputs connectible to a common electrical grid operated by a grid operator;
a control device configured to initiate the following measures upon receiving from the grid operator an emergency signal on occasion of an imminent instability of the electrical grid:
  i) if a battery voltage lies above a voltage currently set by said MPP control element, causing an immediate connection of the battery to the input of said inverter while at the same time maintaining a connection of said photovoltaic generator to said inverter; and
  ii) if the battery voltage lies below the voltage currently set by said MPP control element, deferring a connection of the battery to the input of said inverter until said MPP control element has adjusted the voltage applied to the input to the battery voltage and, following a connection of the battery, further reducing the voltage in order to generate a discharge current from the battery.

2. The photovoltaic installation according to claim 1, wherein said control device is configured to perform the following: if a plurality of connections of batteries have to be deferred, effecting adjustments to the maximum power point of the respective inverters in a time-staggered manner.

3. The photovoltaic installation according to claim 2, wherein said control device is configured to effect a time staggering such that power drops of two partial photovoltaic installations which result from the adjustment to the battery voltage due to leaving the maximum power point of the respective partial photovoltaic installations, do not overlap each other.

4. The photovoltaic installation according to claim 2, wherein said control device is configured to start an adjustment with the respective said partial photovoltaic installation in which a difference between the voltage associated with the current maximum power point and the battery voltage is the smallest.

5. The photovoltaic installation according to claim 1, wherein said control device is configured, if there is a partial photovoltaic installation having a battery voltage above the currently set MPP voltage, to first connect the battery thereof before starting the adjustment to the battery voltage in other said partial photovoltaic installations.

6. The photovoltaic installation according to claim 5, wherein said control device is configured simultaneously initiate the adjustment to the battery voltage in all said partial photovoltaic installations requiring adjustment.

7. The photovoltaic installation according to claim 1, which comprises partial photovoltaic installations with an unconnected photovoltaic generator wherein the battery is directly connected to the input of said inverter.

8. A photovoltaic installation, comprising:
the photovoltaic installation of claim 1 having said partial photovoltaic installations; and
a separate stand-by inverter with its own allocated battery that is adapted to be activated separately in an existing inverter to the associated battery.

9. The photovoltaic installation according to claim 2, wherein said control device is configured to start an adjustment with a respective said partial photovoltaic installation in which a currently available power is lowest.

10. A method of controlling a photovoltaic installation formed of a plurality of partial photovoltaic installations,
wherein each of the partial photovoltaic installations includes a photovoltaic generator that can be connected to an input of an inverter associated therewith, wherein a control element for setting the maximum power point of the partial photovoltaic installation connected thereto is inherent to the inverter, and wherein each partial photovoltaic installation includes a battery that can be connected in parallel to the photovoltaic generator, wherein the outputs of all inverters can be connected to a common electrical grid which is operated by a grid operator, the method comprising:
initiating the following steps with a control device if an emergency signal is received by the control device from the grid operator in the event of an imminent instability of the electrical grid:
  i) immediately connecting the batteries of at least a part of the photovoltaic installations having a battery voltage above a voltage currently set by the MPP control element to the input of the associated inverter while maintaining a connection of the associated photovoltaic generator at the same time;
  ii) for those partial photovoltaic installations the battery voltage of which lies below the voltage currently set by the MPP control element, deferring a connection of the battery to the input of the inverter until the MPP control element has adjusted the voltage applied to the input to the battery voltage, and, after the battery has been connected, further reducing the voltage in order to generate a discharge current from the battery.

11. The method according to claim 10, wherein step i) comprises immediately connecting all of the batteries of all photovoltaic installations having a battery voltage lying above a voltage currently set by the MPP control element to the input of the associated inverter.

* * * * *